No. 720,404. PATENTED FEB. 10, 1903.
J. Q. CHASE.
CONTROLLING GEAR FOR MOTOR VEHICLES.
APPLICATION FILED SEPT. 30, 1901.
NO MODEL. 2 SHEETS—SHEET 1.
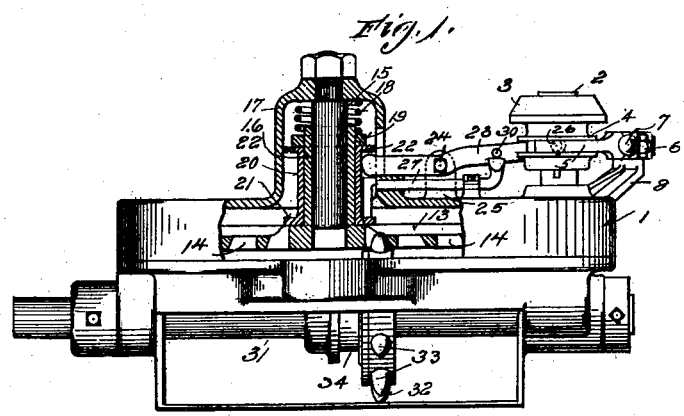
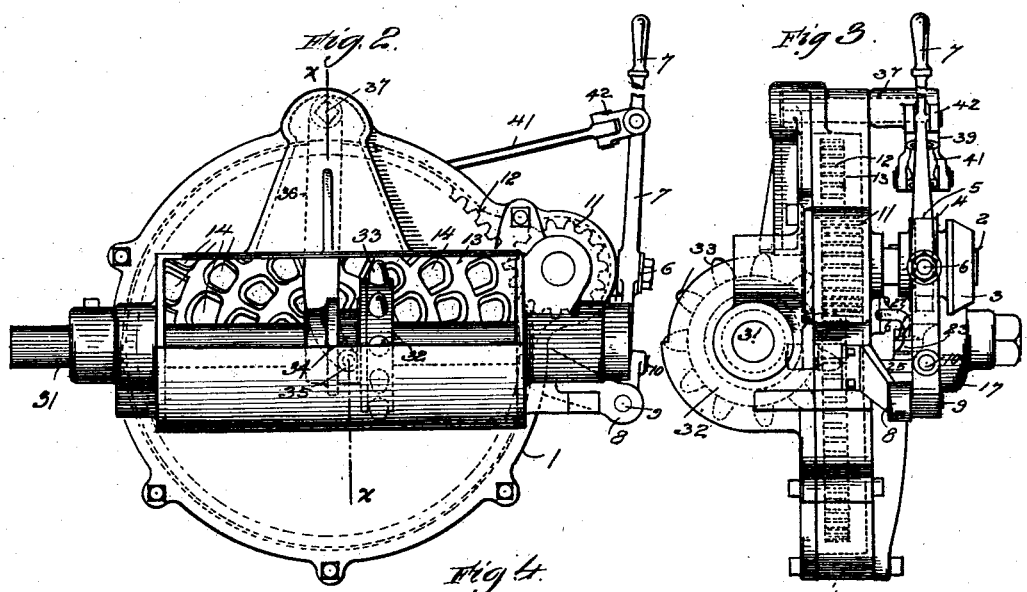
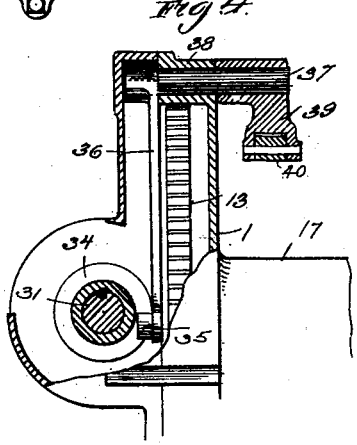
WITNESSES:
J. C. Dawley
[signature]
INVENTOR.
John Q. Chase,
BY H. A. Toulmin.
ATTORNEY.

No. 720,404. PATENTED FEB. 10, 1903.
J. Q. CHASE.
CONTROLLING GEAR FOR MOTOR VEHICLES.
APPLICATION FILED SEPT. 30, 1901.
NO MODEL. 2 SHEETS—SHEET 2.
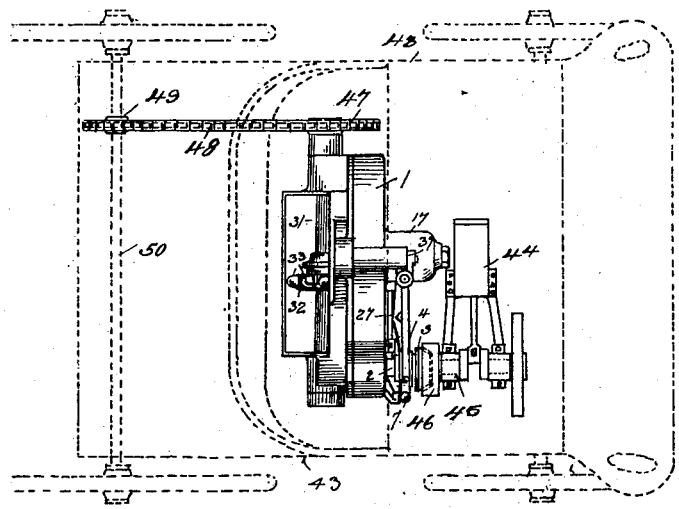
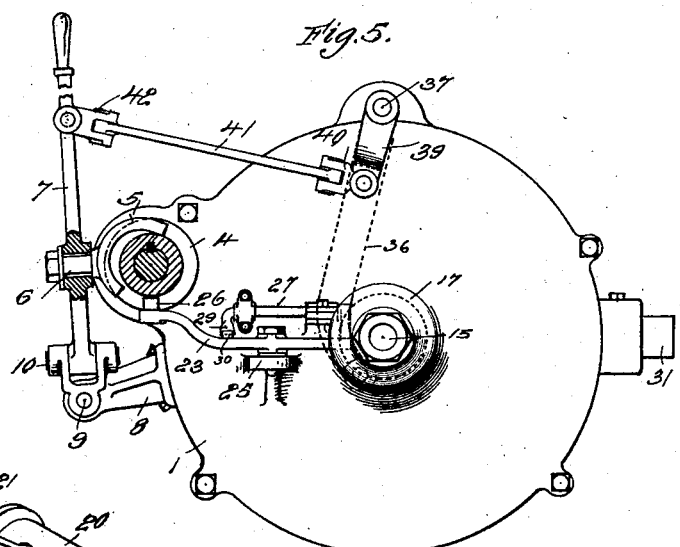
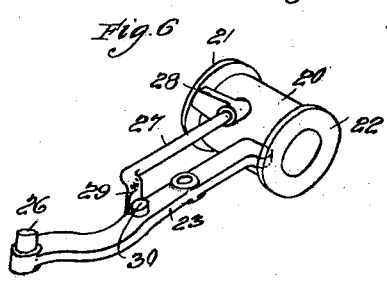
WITNESSES: INVENTOR.
ATTORNEY.

UNITED STATES PATENT OFFICE.

JOHN Q. CHASE, OF DAYTON, OHIO, ASSIGNOR TO WILL I. OHMER, OF DAYTON, OHIO.

CONTROLLING-GEAR FOR MOTOR-VEHICLES.

SPECIFICATION forming part of Letters Patent No. 720,404, dated February 10, 1903.

Application filed September 30, 1901. Serial No. 77,004. (No model.)

*To all whom it may concern:*

Be it known that I, JOHN Q. CHASE, a citizen of the United States, residing at Dayton, in the county of Montgomery and State of Ohio, have invented certain new and useful Improvements in Controlling-Gears for Motor-Vehicles, of which the following is a specification, reference being had therein to the accompanying drawings.

This invention relates to controlling-gears for motor-vehicles, and has for its object to provide a gear located between the motor-shaft and the driven shaft or axle of the vehicle and so constructed that by means of a single hand-lever the power derived from the motor-shaft may be so controlled as to regulate both the speed and direction of the vehicle, the same lever serving, if desired, also to stop and start the vehicle.

To these ends my invention consists in certain novel features, which I will now proceed to describe and will then particularly point out in the claims.

In the accompanying drawings, Figure 1 is a plan view, partly in section and with a portion of the casing removed, of a mechanism embodying my invention in one form. Fig. 2 is a rear elevation of the same. Fig. 3 is a side elevation. Fig. 4 is a detail sectional view taken on the line *x x* of Fig. 2. Fig. 5 is a front elevation, partly in vertical section. Fig. 6 is a detail perspective view of a portion of the mechanism, and Fig. 7 is a plan view illustrating the application of the device to a motor-vehicle.

In the said drawings, in which I have shown a mechanism embodying my invention in its preferred form, 1 indicates a suitable housing, in which is mounted in suitable bearings a shaft 2, having splined thereon a clutch member 3, by means of which motion may be imparted to said shaft 2 from a suitable motor. The clutch member 3 is provided or connected with a grooved collar 4, which is engaged by a yoke 5, pivoted at 6 in a hand-lever 7, the yoke being of sufficient length to remain in engagement with the grooved collar while permitting a movement of the lever 7 toward and from said collar of an extent sufficient to accomplish the functions hereinafter set forth. The lever 7 is connected to a bracket 8, extending from the housing 1, by means of a universal joint of any approved construction—such, for instance, as two pivots 9 and 10, arranged at right angles to each other.

The shaft 2 is provided on that end thereof lying within the housing 1 with a pinion 11, (shown in dotted lines in Figs. 2 and 3,) and this pinion meshes with gear-teeth 12 on the periphery of a disk 13, mounted within the housing 1. The flat body of the disk 13 is provided with a plurality of concentric rows of apertures 14, located at successively increasing distances from the center of said disk, said apertures being suitably shaped to permit a proper clearance of the teeth of the pinion, hereinafter referred to, which mesh therewith and prevent backlash. The disk 13 is mounted upon a stud-shaft 15, which extends into a sleeve 16, extending from the non-working face of the disk. The stud-shaft 15 is secured to the housing 1, which is provided with a hollow boss 17 to accommodate the stud-shaft and the sleeve of the disk. The disk is thrust normally outward by means of a spring 18, which in the present instance is shown as coiled around the stud-shaft, bearing at one end against the end of the boss 17 and at the other end against a collar 19, secured to the sleeve 16. A second sleeve 20 is mounted on the sleeve 16 between the body of the disk 13 and the collar 19 and is provided with radial flanges 21 and 22 at its ends. A lever 23, pivoted between its ends at 24 on a bracket 25, extending from the housing 1, has one of its ends adapted to engage with the flange 22 of the sleeve 20, while its other end is provided with a pin 26, which engages with the groove of the collar 4. A rock-shaft 27, mounted in suitable bearings on the housing 1, is provided at one end with a finger or dog 28, which is adapted to engage with the flange 21 of the sleeve 20, while the other end of the rock-shaft is provided with a finger 29, adapted to engage with the lever 23, which may be provided with a pin or projection 30 for this purpose. These parts are so constructed that the dog 28 tends to fall by gravity into the path of the flange 21 or is otherwise caused to normally tend to move into that position.

A shaft 31 extends across the face of the disk 13, being mounted in suitable bearings in the housing 1, and on this shaft there is splined a pinion 32, having teeth 33, conoidal in shape or otherwise suitably formed to mesh with the apertures 14 of the disk 13. The hub of this pinion is provided with a groove 34, which is engaged by a projection 35 on an arm 36 of a rock-shaft 37, mounted in a suitable bearing 38 at the top of the housing 1, the arm 36 lying within the housing. The projecting end of the rock-shaft 37 is provided with an arm 39, which is connected by a universal joint 40 with a link 41, which is in turn connected by a universal joint 42 with the hand-lever 7.

Before proceeding to the description of the operation of the device I will describe one mode of applying the same to a motor-vehicle, the same being illustrated in Fig. 7, in which the body of the motor-vehicle is indicated in dotted lines at 43. 44 indicates a suitable motor, the main shaft 45 of which is provided with a clutch member 46, adapted to be engaged by the clutch member 3. The shaft 31 is shown as provided with a sprocket-wheel 47, around which passes a sprocket-chain 48, which also passes around a sprocket-wheel 49 on the driving-axle 50 of the motor-vehicle.

The apparatus being thus constructed and assuming that the motor is in constant operation when the clutch member 3 is engaged with the clutch member 46, the shaft 2 will be rotated and by means of the pinion 11 will impart rotary movement to the disk 13, which in turn will drive the pinion 32 and shaft 31 with a speed depending upon the particular circular row of apertures 14 with which said pinion is in engagement, the speed of the vehicle being of course determined by the speed of the shaft 31. In the present instance the pinion is shown as engaged with the innermost row of holes and on that side of the axis of the disk which will drive the vehicle in a forward direction. If it is desired to increase the speed, the hand-lever 7 is first moved to the rear, turning around the pivot 10. This movement disengages the clutch member 3 from the clutch member 46 and disconnects the gearing from the motor. At the same time the movement of the grooved collar 4, by reason of the engagement of said collar with the lever 23, causes said lever to engage with the finger 29 of the rock-shaft 27 and raises the dog 28 out of the path of the flange 21 on the sleeve 20. This operation occurs at the initial movement of the lever 23, and further movement of said lever causes its inner end to engage with the flange 22 of the sleeve 20, thereby moving said sleeve and the disk 13 away from the pinion 32 against the action of the spring 18 until the disk is disengaged from the pinion. The hand-lever 7 may then be moved away from the disk 13, this movement, through the link 41 and arm 39, actuating the rock-shaft 37 and by means of the arm 36 moving the pinion 32 along the shaft 31 across the face of the disk toward the periphery thereof in a direction toward the right in Fig. 2. This movement may be continued until the pinion is brought into position to mesh with that one of the concentric rows of holes 14 which will give the desired speed, whereupon the lever 7 may be moved forward again, thereby permitting the spring 18 to move the disk 13 out into engagement with the pinion 32. When this movement of the disk has been completed, the locking-dog 28 will engage with the flange 21 and will hold the disk in proper engagement with the pinion. At the same time the forward movement of the hand-lever causes the clutch member 3 to reëngage with the clutch member 46 of the motor, so that power is again applied to the gearing to drive the vehicle at the speed desired.

When it is desired to reverse the direction of movement of the vehicle, the same series of operations is gone through with, except that the hand-lever 7 is moved toward the disk to an extent sufficient to carry the pinion 32 past the center of the disk and to cause it to engage with the holes of the disk on the opposite side of said center, whereupon it will be manifest that the direction of motion of the shaft 31 and of the vehicle will be reversed. In the present instance I have only shown a range of motion such as to give a single speed when the direction of motion is reversed, as this is all that is practically required; but it is obvious that the mechanism may be so organized as to permit a variation of speed when the mechanism is reversed.

It will be seen that by reason of the construction which I have devised a single hand-lever serves not only to start and stop the vehicle by controlling the clutch, by means of which the motor is connected with the driving-axle of the vehicle, but said hand-lever also serves not only to regulate the speed of the vehicle, but also the direction of its motion. Furthermore, it will be seen that the construction is such that the gearing is first disconnected from the motor and the disk is disengaged from the pinion before the pinion is shifted across the face of the disk, a single lever serving to effect these results. It will be seen that movement of this single hand-lever in one direction disengages the disk and pinion, while movement of the same lever in a direction transverse to the direction of the first or disengaging movement thereof shifts the pinion across the face of the disk to the desired position. It will be further noted that a locking device is provided which holds the disk and pinion in proper engagement when at work, said locking device being disengaged by the initial movement of the hand-lever for the purpose of disengaging the disk and pinion and said locking device automatically locking the disk and pinion in position after their reëngagement.

I do not wish to be understood as limiting myself to the precise details of construction hereinbefore described, and shown in the accompanying drawings, as it is obvious that these details may be modified without departing from the principle of my invention.

Having thus fully described my invention, what I claim as new, and desire to secure by Letters Patent, is—

1. A controlling-gear for motor-vehicles comprising a shaft, a pinion mounted to slide thereon and rotate therewith, a disk across the face of which said shaft extends, said disk having concentric rows of female teeth and being movable toward and from the pinion, and a lever fulcrumed to move in planes at an angle to each other and operatively connected with both disk and pinion, the movements of the lever in one plane controlling the movements of the disk toward and from the pinion, and the movements of the lever in the other plane controlling the movements of the pinion across the face of the disk, substantially as described.

2. A controlling-gear for motor-vehicles comprising a shaft, a pinion mounted to slide thereon and rotate therewith, a disk across the face of which said shaft extends, said disk having concentric rows of female teeth and being movable toward and from the pinion, a lever operatively connected with both disk and pinion and controlling the relative movements of both of said parts, and a locking device controlled by said lever to hold the disk in engagement with the pinion, substantially as described.

3. A controlling-gear for motor-vehicles comprising a shaft, a pinion mounted to slide thereon and rotate therewith, a disk across the face of which said shaft extends, said disk having concentric rows of female teeth and being movable toward and from the pinion, a lever operatively connected with both disk and pinion and controlling the relative movements of both of said parts, and an automatic locking device normally holding said disk in engagement with said pinion, said lever being adapted to release said locking device when said lever is operated to disengage the disk from the pinion, substantially as described.

4. A controlling-gear for motor-vehicles comprising a shaft, a pinion mounted to slide thereon and rotate therewith, a disk across the face of which said shaft extends, said disk having concentric rows of female teeth and being movable toward and from the pinion, a motor, a clutch controlling the connection between said motor and the disk, and a lever operatively connected with and controlling said clutch, disk and pinion, substantially as described.

5. A controlling-gear for motor-vehicles comprising a shaft, a pinion mounted to slide thereon and rotate therewith, a disk across the face of which said shaft extends, said disk having concentric rows of female teeth and being movable toward and from the pinion, a motor, a clutch controlling the connection between said motor and disk, and a lever fulcrumed to move in planes at an angle to each other and operatively connected with said clutch, disk and pinion, the movements of the lever in one plane controlling the clutch and the movements of the disk toward and from the pinion, and the movements of the lever in the other plane controlling the movements of the pinion across the face of the disk, substantially as described.

6. A controlling-gear for motor-vehicles comprising a shaft, a pinion mounted to slide thereon and rotate therewith, a disk across the face of which said shaft extends, the face of said disk being provided with female teeth and its periphery being provided with gear-teeth, said disk being movable toward and from the pinion, a second shaft provided with a pinion to mesh with the gear-teeth on the periphery of the disk and having a clutch member slidably mounted thereon, whereby it may be connected with a motor, said clutch member being provided with a grooved collar, a hand-lever having a yoke to engage the grooved collar, said hand-lever being fulcrumed to move in planes at an angle to each other, a lever fulcrumed between its ends and having one end engaging the grooved collar of the clutch member and the other end engaging a part connected with the disk, and a rock-shaft parallel with the axis of rotation of the shaft and provided with two arms, one of which engages the pinion to move the same across the face of the disk, and a link connecting the other arm of the rock-shaft with the first-mentioned lever, substantially as described.

7. In a controlling-gear for motor-vehicles, the combination, with a shaft having a pinion thereon, of a disk provided with concentric rows of female teeth and provided with a tubular journal or sleeve, a stud-shaft on which said tubular journal is mounted, a spring for forcing said disk normally toward the pinion, radial flanges extending from said tubular journal, a lever engaging one of said flanges to withdraw the disk from the pinion, and a rock-shaft having a dog to engage the other one of said flanges to lock the disk in mesh with the pinion and provided at its other end with a finger engaged in the path of the lever, whereby the initial movement of the lever to withdraw the disk releases the locking-dog, substantially as described.

8. A controlling and reversing gear for motor-vehicles, comprising a shaft, a pinion mounted to slide thereon and rotate therewith, a disk across the face of which said shaft extends, said disk having concentric rows of teeth and being movable toward and from the pinion, and said pinion having a range of movement on the shaft extending from one side of the center of the disk to the other side of said center, and also from the center of the disk to its periphery, and a lever fulcrumed to move in planes at an angle to each other and operatively connected with both disk and pinion, the movements of the lever in one plane controlling the movements of the disk toward and from the pinion, and the movements of the lever in the other plane independently controlling the movements of the pinion across the face of the disk, whereby the pinion may be shifted from one side of the center of the disk to the other to reverse the direction of motion of the shaft, or across the face of the disk between the center and periphery to control the speed of the shaft, substantially as described.

In testimony whereof I affix my signature in presence of two witnesses.

JOHN Q. CHASE.

Witnesses:
E. THOMPSON,
D. B. WHISTLER.